Jan. 18, 1949.    W. H. STEWART    2,459,196
ELECTRICAL LOGGING METHOD AND APPARATUS
Filed Dec 22, 1938
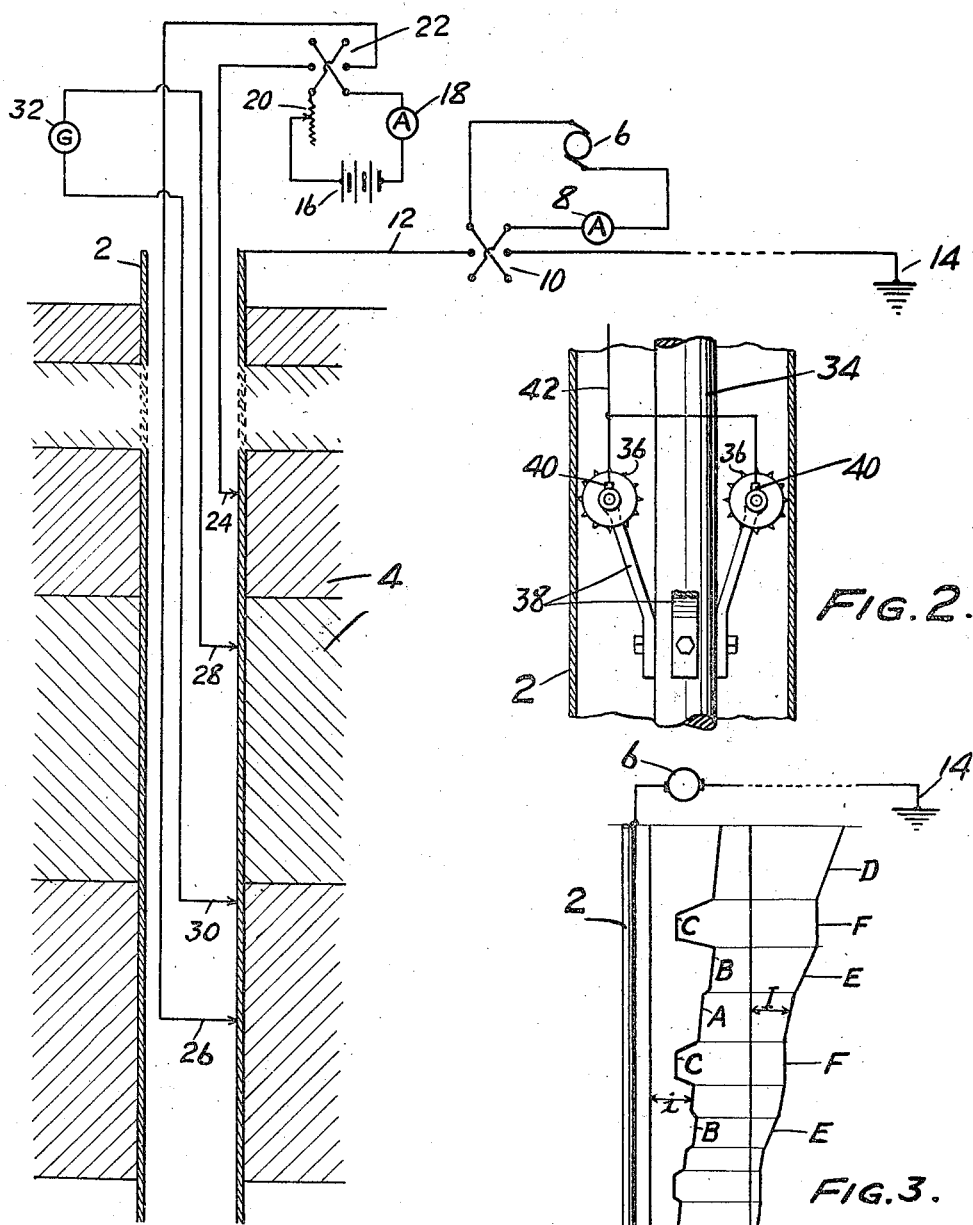
INVENTOR
William H. Stewart Patented Jan. 18, 1949

2,459,196

UNITED STATES PATENT OFFICE 2,459,196

ELECTRICAL LOGGING METHOD AND APPARATUS

William H. Stewart, Beaumont, Tex., assignor to Sun Oil Company, Philadelphia, Pa., a corporation of New Jersey Application December 22, 1938, Serial No. 247,139

9 Claims. (Cl. 175—182)

This invention relates to a method and apparatus for effecting determination of the nature of geological formations penetrated by bore holes.

There have been heretofore proposed various successfully used methods for the electrical logging of bore holes to determine the nature of the strata penetrated thereby. Such logging methods, however, have been confined to the logging of uncased portions of bore holes containing drilling mud or other fluid.

At the present time there exist large numbers of holes which were drilled and cased prior to the use of electrical logging methods; and, particularly when the major source of oil has been exhausted, it becomes desirable to determine whether such holes have passed through strata of minor production possibilities but which should, if possible, be tapped by penetration of the casing at their locations. Additionally, even though a well may have been logged initially, it is sometimes desirable to log it again after a long period of time to determine whether any changes have occurred which might be of interest.

None of the various logging proposals heretofore made, however, have been usable to determine the nature of the strata surrounding a casing, inasmuch as such a casing provides substantially for ordinary logging methods, a unipotential surface serving as an impenetrable boundary for the inhomogeneous electrical conditions which are depended upon for logging.

It is the object of the present invention to provide a method and apparatus for logging cased portions of holes, use being made of the variations in a current flowing to or from the casing and dependent upon the nature of the strata surrounding the casing. The fact that the casing is a very good conductor and hence approaches a unipotential surface makes it difficult to secure what might be called "fine-grained" determinations of the strata; but by the use of the present method and apparatus substantially extended regions of high or low resistance strata may be determined, such, for example, as regions of the order of ten to twenty-five feet upwards.

The invention and its objects, particularly those relating to details, will be apparent from the following description, read in conjunction with the accompanying drawings, in which:

Figure 1 is a diagrammatic sectional view illustrating the cased portion of a hole and the apparatus associated therewith for logging it;

Figure 2 is a vertical sectional view somewhat diagrammatic in nature, indicating the type of arrangement utilized to secure good electrical contact of electrodes with the metal of the casing; and Figure 3 is a diagrammatic view illustrating the nature of the results secured.

Referring first to Figure 1, there is illustrated therein at 2 a cased portion of a bore hole through which logging is to be done. This cased portion of the bore hole may be surrounded by strata indicated at 4 of greater or less vertical extent. The strata in the present case have been illustrated as having the same order of vertical extent as the electrode spacing to indicate how the apparatus is used to give rise to average rather than fine-grained results.

In a preferred method of practicing the invention there is provided at the surface a direct current generator indicated at 6, which generator may be of a low voltage type, but having a very heavy current capacity, being, for example, of the type of generators used for welding. This generator is connected through a high reading ammeter 8 to a double-pole double-throw switch indicated at 10 in conventionalized fashion, the knife terminals of which are respectively connected at 12 to the top of the casing and at 14 to ground. The ground should be at as great a distance as possible from the casing, and preferably should be of a long vertical extent as might be provided, for example, by connection of the ground line to a well casing preferably at a great distance from the casing within which logging is taking place.

At this point the result of the introduction of the current into the well may be considered with reference to Figure 3, which shows diagrammatically what occurs. The well casing is of quite low resistance and in a sense forms a long transmission line having an open distant end, but having leakage through its length. If, therefore, the ground 14 is at a great distance and preferably extended parallel to the casing 2, and if it is assumed that the strata surrounding the casing are completely homogeneous, the current generated will flow from the casing 2 substantially normally to its length. For convenience, reference will be made to flow "from" the casing though it will be understood the current flow in either direction may occur and, in fact, repeated reversal is desirable to distinguish the exploring current from strays and to avoid polarization. If the casing 2 had no resistance, then from every unit length of it the same current would flow into the surrounding soil. Since the casing 2 actually has a resistance, this will not be the case, but the current flowing from each unit length of it will decrease in an approximately linear fashion from its upper to its lower end, i. e., the plot of the current density flowing from the casing against its length would be a straight line.

If the casing is surrounded by strata having different resistivity, however, this will not be the case. A portion of the casing surrounded by a stratum of high resistivity will have relatively little current flowing from it. On the other hand, a portion surrounded by a stratum of low resistivity will have an increased amount of current flowing from it. As a result of varying resistivity of strata, therefore, the straight line curve just mentioned will more closely resemble the curve indicated at A in Figure 3. This curve represents the current flowing to the strata from a unit length of the casing plotted against depth. The curve may be regarded as deviating from a sloping curve, the slope of which depends upon the resistivity of the casing, by having rises as indicated at B at locations of more conductive strata such as, for example, salt water formations, and depressions as indicated at C at locations of more resistive strata such as, for example, oil sands. Accordingly, if it were possible to measure along the length of the casing, the ordinates of a curve such as A indications of the resistivity of the surrounding formations could be secured.

Such measurements, however, cannot be well made without penetrating the casing, which is not easily accomplishable, and accordingly, indirect methods of measurement are preferably adopted, and from them a curve such as that indicated at A can be calculated.

The principle on which the preferred embodiment of the invention operates may be understood by considering not the current flowing out of the casing at any point, but rather the current flowing along the casing at any point. At the top of the casing the total current flowing from the casing will be flowing along it. On the other hand, at a point half way down the casing there will be flowing along the casing only that current which leaves the casing below that point and so on. Stated mathematically, the current flowing along the casing at any point is equal to the integral along the length of the casing therebelow of the current flowing from it per unit length. Considering, for example, currents $i$ leaving the casing as indicated by the curve A, the currents, $I$, flowing along the casing may be indicated by a curve such as D, which is the integral curve from the bottom of the casing upwards of the curve A. The deviations of the curve A from its average will show up as changes in slope such as E and F in the integral curve. If, therefore, measurements are made giving the values of $I$, the current flowing along the casing, at various depths thereof there may be plotted a curve such as D the variations in slope of which may be translated into the variations along the length of the casing of the current per unit length flowing therefrom, i. e., differentiation of the curve D will give a curve such as A indicative of the variations in resistivities of the strata.

The determination of the current $I$ may be accomplished in various ways, of which a preferred one may be described with reference to Figure 1. The casing 2, supplied with a heavy current from the generator 6, desirably of a constant current type so as to give a constant reading of the ammeter 8, has contacting with it four electrodes 24, 26, 28 and 30, maintained in fixed spacing with respect to each other by reason of their being carried by a member 34 which will be referred to hereafter. The electrodes thus definitely spaced from each other are caused to traverse the interior of the casing and are connected by means of a multi-conductor cable, in this case a cable containing four conductors, to the surface. This cable may be conventionally wound upon a drum with the ends of the conductors brought to slip rings for surface connections. Such arrangements are commonly used in connection with well logging and need not be described in detail herein.

A source of current indicated as a battery 16, though a generator may be used instead, serves to provide current to the electrodes 24 and 26 through an ammeter 18, a rheostat 20 and a reversing switch 22.

The electrodes 28 and 30, which are intermediate 24 and 26, are connected to a sensitive galvanometer 32 serving as a very low reading millivoltmeter. While this has been conventionalized in the drawing, since the voltages which the galvanometer 32 should be capable of indicating are of a very small order of magnitude, the electrodes may preferably be connected to a direct current amplifier which in turn feeds a sensitive galvanometer so that very minute differences of potential may be noted.

Reversing switches have been conventionally illustrated at 10 and 22. These switches should be operated in synchronism to reverse the flow of current and hence the movable blades of both switches may be connected to a common operating arm. Alternatively, (and preferably) these reversing switches take the form of commutator arrangements on a common shaft which may be driven at a low speed to produce current reversals at a low frequency, for example, up to five per second. The receiving commutator in the observing circuit should preferably have wide insulating segments arranged to open the observing circuit just in advance of interruption of the excitation, and to close the observing circuit after the transients in the reversed excitation have damped out. (The transients may last as long as 0.2 second in five thousand feet of pipe.) During adjustments, the galvanometer 32 will thus be subjected to an alternating current having either a very low and indefinite frequency of hand manipulation of the switch is provided, or having a frequency up to five per second if a commutator arrangement is used. The galvanometer 32, therefore, is preferably of a type which is highly damped and may, for example, be of a ballistic variety which will show integrated movements in response to the rectified reversed current. As will be pointed out immediately, when adjustment is effected a condition of zero reading of the galvanometer should result with no changes during the reversals. It is, therefore, a null type of instrument. If desired, it may consist of a cathode ray oscillograph or electron ray indicator connected through an amplifier to electrodes 28 and 30, balance being indicated by cessation of movement of its luminous spot.

While a more complicated set-up automatic recording may be effected, for example, by an automatic potentiometer arrangement to secure a null reading of the galvanometer by adjustment of the rheostat 20, the recording being accomplished on a strip which is moved in proportion to the lowering of the electrode assembly, it will be in general more convenient to have one or more operators manipulate the adjustments and note the corresponding depths of the electrodes to secure the data necessary for the plotting of a curve such as D.

The theory of operation of the apparatus will be best understood by considering operation with the switches 10 and 22 in one position. Their reversal is solely for the purpose of removing effects of stray potentials and preventing polarization, and as will be obvious, will not affect the proper operation or results now to be described.

With the electrodes in any given position and the current from the generator 6 measured by the ammeter 8 being maintained at a constant value for each determination, roughly proportional to the depth of observation, the rheostat 20 is adjusted until the voltage indication of the galvanometer 32 is zero. Inasmuch as the casing will have some resistance between 28 and 30, the absence of a voltage drop between 28 and 30 would mean that no current was flowing in the section of the casing between 28 and 30 and, considering matters mentioned below, between 24 and 26. The current reading on the ammeter 18 will then have (within about ½%) the value of that current which would be flowing in the casing between 24 and 26 by reason of the introduction at the top of the casing of the current indicated by the ammeter 8 if the exploratory electrode circuit was not present.

That this is true can be most readily understood by considering that the circuit is of a linear type and that, therefore, in accordance with circuit theory, the currents due to various sources, if said sources were used alone, may be algebraically added to determine the results if a number of sources are used simultaneously. If, for example, a certain current I were flowing through the casing between the electrodes 24 and 26 with the source 6 used alone, and, with the addition of source 16, there were zero current flowing through this portion of the casing, then it is evident that the current through this portion of the casing which would be produced by the source 16 alone would be —I. (To be accurate this would be slightly less in an actual configuration due to the distributed nature of the conductors involved.) But it will be evident that the current measured by the ammeter 18 will be —I assuming, as will be the case, that the rheostat 20 makes the resistance of the circuit of the source 16 many times higher than the resistance of a portion of the casing between the electrodes 24 and 26 so that it may be assumed that the effect of shunting of the portion of the casing between 24 and 26 by the electrode circuit is negligible. Thus under conditions of no current flow between electrodes 24 and 26, the ammeter 18 will give directly the value of the current I which would flow between the locations of the electrodes with the source 6 used alone. This is the value of current which is to be plotted to give the curve D, the separate readings each to be reduced to a standard value of exciting current.

In order to detect strata of small vertical extents, the spacing of the electrodes 24 and 26 should be as small as possible. The operation indicated above, however, is made on the assumption that the flow of current along the casing is uniform throughout the circumference of the casing. If single contact points are provided at 24 and 26, such uniformity of flow will not exist throughout the entire length of casing between these electrodes, and the non-uniformity will be dependent upon the diameter of the casing. Accordingly, therefore, the spacing between electrodes 24 and 28 and between electrodes 26 and 30 should be at least twice, and preferably more than five times, the diameter of the casing, so that between the electrodes 28 and 30 there is substantially uniform flow along the casing, the assymetrical conditions of flow existing primarily adjacent the electrodes 24 and 26 and appreciably existing from about two to five times the diameter of the casing away from these electrodes.

The spacing between the electrodes 28 and 30 is also important. Since the reading is done by a null method, there will be no appreciable distortion of flow lines at these electrodes. However, since the resistance of the casing per foot of length is very low even though the currents flowing are quite high, sensitivity can only be secured if there is sufficient resistance between the electrodes 28 and 30 to give with negligibly small currents flowing between them a detectable voltage drop. For this reason, and also because it is better to take an average over such length of casing that an average uniformity can be expected, it is not generally feasible to use a spacing between the electrodes 28 and 30 of much less than three to five feet. As a result, therefore, the method cannot be expected to give positive indications of the existence of strata having thicknesses of less than about five feet, unless variations in resistivity are very great.

It might be remarked in connection with the above that through the long casings commonly used the leakage of current in a length of the order of the spacing between the electrodes may generally be neglected. While it will be obvious that various refinements may be introduced by way of corrections in the results or by the use of more complicated apparatus for the purpose of making the corrections automatically, such refinements are generally quite unwarranted by reason of the relative coarseness of the results secured. The measurements may be made in this and other fashions, generally in accordance with the methods used for the determination of electrolysis conditions along pipe lines or other grounded structures and, in fact, such methods are generally directly applicable, though the contacts of electrodes with the casing must be on its inside rather than on the outside as in the case of the usual measurements made along pipe lines. Reference may be made, for example, to the matters discussed in the patents to John M. Pearson, Nos. 2,086,737 and 2,103,636 for these matters and methods which may be used if greater refinements and accuracy are desired. In general, however, such refinements will not lead to the securing of any less coarse indications of the strata penetrated by the casing.

There has not been mentioned heretofore another disturbing factor which in some cases may have to be taken into account, namely, the presence of joints in the casing. If the joints are welded ones, their effects may be quite negligible. If not welded, however, corrosion at the joints may introduce substantial resistance which might materially affect the current distribution. Accordingly, after securing results, due account must be taken of the construction of the casing and the location of the joints. If necessary, separate measurements may be made by means of apparatus introduced within the casing and connected to the surface to determine the resistivities across the joints, as described, for example, in Pearson Patent 2,103,636.

Proper operation also depends upon good electrical contact between the electrodes and the casing, this being particularly necessary in the case of the electrodes which are used for introducing current, i. e., 24 and 26. Accordingly, there has been illustrated in Figure 2 in a diagrammatic fashion a preferred arrangement adapted to secure good contact. This comprises a member 34 which is arranged to carry all of the electrodes in fixed relationship with each other as indicated above. Each of the electrodes may comprise a plurality of wheel members 36 provided with sharp points preferably in the nature of cutters which will cut away rust and coating materials in the inside of the casing, biting down into the metal of the casing. These electrodes are mounted in insulating bushings in the ends of heavy spring members 38 secured to the carrier 34 and adapted to urge the electrode members 36 into contact with the casing walls. Suitable brushes indicated at 40 are mounted to contact with the members for connection to the conductors 42 within the cable supporting the carrier 34 and extending to the surface. It may be remarked that while the apparatus will generally be operated in aqueous liquid within the casing, which will be conductive, nevertheless, the conductivity of such a liquid will be very low compared with the metallic conductivity between the electrodes and casing and through the casing so that its effect in short circuiting the electrodes may be completely neglected.

It will be obvious that various methods of measurement may be used so long as they serve to indicate directly or indirectly the current passing to or from the casing at various points along its length. The movement of the electrode assembly between readings may be, for example, of the order of one-half to twice or more of the spacing between the electrodes 26 and 24, depending upon the details of the strata which it is desired to detect. Preferably, measurements are made with the idea of securing an integrated curve such as D from which the variations in flow to or from the casing can be readily deduced.

The use of direct current or commutated direct current giving rise to a low frequency alternating current has been described. However, alternating current supply may be used with the provision of a definite phase relationship between the main current supply and that used for balancing purposes. In general, however, if alternating current is used only low frequencies are feasible because of the inductance effects resulting from the use of steel casing, and from the large area of the earth current circuit.

It will also be obvious that with either direct or alternating current operation a null method need not be used, and instead variations made of local current flow through the casing accompanied by measurements of the variations of the current even if the variations do not result in the reduction of the current to zero. A null method, however, is to be preferred since it makes the indications substantially independent of the constants of auxiliary measuring circuits.

The current need not be introduced to the casing at the surface, but may be introduced at some point or points within the casing below the top. Such introduction of the current may be particularly desirable in the case of the presence of insulated or badly corroded joints. The resulting manipulations must, of course, take into account the particular point at which the current may be introduced.

What I claim and desire to protect by Letters Patent is:

1. The method of determining the location and character of strata penetrated by a bore hole containing a conductive casing comprising providing a flow of current between the casing and a location remote from the casing, applying a current between two points along the casing to reduce to substantially zero the current flowing along the casing between the points, and observing the conditions required to secure such substantially zero current between said points.

2. The method of determining the location and character of strata penetrated by a bore hole containing a conductive casing comprising providing a flow of current between the casing and a location remote from the casing, applying a current between two points along the casing to reduce to substantially zero the current flowing along the casing between the points, causing said points to traverse the casing while spaced a constant distance from each other, and observing the conditions required to secure such substantially zero current between said points at various locations along the casing.

3. Apparatus for determining the location and character of strata penetrated by a bore hole containing a conductive casing comprising means providing a flow of current in the casing and surrounding strata, means for applying a voltage between two points along the casing to reduce to substantially zero the current flowing along the casing between the points, and means for indicating the attainment of such substantially zero current flow between said point.

4. Apparatus for determining the location and character of strata penetrated by a bore hole containing a conductive casing comprising means providing a flow of current in the casing and surrounding strata, means for applying a voltage between two points along the casing to reduce to substantially zero the current flowing along the casing between the points, means for indicating the attainment of such substantially zero current flow between said points, and means for causing said points to traverse the casing while spaced a constant distance from each other.

5. Apparatus for determining the location and character of strata penetrated by a bore hole containing a conductive casing comprising means providing a flow of current in the casing and surrounding strata, means for applying a voltage between two points along the casing to affect the current flowing between said points, and means for indicating the current flow between said points.

6. Apparatus for electrically investigating geological formations traversed by a cased drill hole comprising a source of current, electrical connections between the source of current and the casing of the drill hole and between the source of current and a ground point remote from said drill hole, two exploring electrodes arranged to be suspended at different depths in said drill hole and in electrical metallic contact with the interior of the casing thereof, a measuring instrument at the surface, and insulated conductors connecting said exploring electrodes to said measuring instrument.

7. An electrical process for determining the nature of the geological formations traversed by a cased drill hole comprising applying terminals of a voltage supply to the casing of the drill hole and to a remote ground, moving two exploring electrodes to various depths in said cased hole in electrical metallic contact with the interior of the casing thereof, and measuring voltage variations between said electrodes.

8. Apparatus for electrically investigating geological formations traversed by a cased drill hole comprising a source of current, electrical connections between the source of current and the casing of the drill hole and between the source of current and a ground point remote from said drill hole, two exploring electrodes arranged to be suspended at a fixed distance from each other and at different depths in said drill hole and in electrical metallic contact with the interior of the casing thereof, a measuring instrument at the surface, and insulated conductors connecting said exploring electrodes to said measuring instrument.

9. An electrical process for determining the nature of the geological formations traversed by a cased drill hole comprising applying terminals of a voltage supply to the casing of the drill hole and to a remote ground, moving two exploring electrodes having a fixed spacing between them to various depths in said cased hole in electrical metallic contact with the interior of the casing thereof, and measuring voltage variations between said electrodes.

WILLIAM H. STEWART.

REFERENCES CITED

The following references are of record in the file of this patent:

UNITED STATES PATENTS

| Number | Name | Date |
|---|---|---|
| 1,819,923 | Schlumberger | Aug. 18, 1931 |
| 1,826,961 | Slichter | Oct. 13, 1931 |
| 1,845,379 | West | Feb. 16, 1932 |
| 1,863,542 | Nichols | June 14, 1932 |
| 1,894,328 | Schlumberger | Jan. 17, 1933 |
| 2,133,786 | Neufeld | Oct. 18, 1938 |
| 2,140,798 | Jakosky | Dec. 20, 1938 |
| 2,397,254 | Ennis | Mar. 26, 1946 |
| 2,400,593 | Newfeld | May 21, 1946 |
| 2,414,194 | Ennis | Jan. 14, 1947 |